(12) United States Patent
Nakamura et al.

(10) Patent No.: US 10,901,299 B2
(45) Date of Patent: Jan. 26, 2021

(54) ELECTRONIC APPARATUS (71) Applicant: LENOVO (SINGAPORE) PTE. LTD., Singapore (SG)

(72) Inventors: Fusanobu Nakamura, Yokohama (JP); Hiroshi Itoh, Yokohama (JP); Mitsuhiro Yamazaki, Yokohama (JP); Atsushi Nagashima, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 67 days.

(21) Appl. No.: 16/449,314

(22) Filed: Jun. 21, 2019

(65) Prior Publication Data
US 2020/0218130 A1 Jul. 9, 2020

(30) Foreign Application Priority Data

Jan. 9, 2019 (JP) ................. 2019-002061

(51) Int. Cl.
*G03B 9/10* (2006.01)
(52) U.S. Cl.
CPC ..................... *G03B 9/10* (2013.01)
(58) Field of Classification Search
CPC ...................................................... G03B 9/10
See application file for complete search history.

(56) References Cited

U.S. PATENT DOCUMENTS 5,258,797 A * 11/1993 Oyoshi ............... G02B 7/04
396/132
5,459,544 A * 10/1995 Emura ............... G03B 9/00
396/257

FOREIGN PATENT DOCUMENTS

JP 2016-021259 A 2/2016

* cited by examiner

*Primary Examiner* — Noam Reisner
(74) *Attorney, Agent, or Firm* — Shimokaji IP (57) ABSTRACT

An electronic apparatus equipped with a camera includes a shutter mechanism which includes: a plate that is installed so as to be able to move between a first position shielding a lens of a camera from light and a second position not shielding the lens of the camera from light; and a control unit that controls electric power from a power unit that causes a first wire or a second wire to thermally shrink. The plate is moved from the first position to the second position by the first operation lever, and, when the plate is in the second position, causes the second wire to thermally shrink to thereby drive a second operation lever, so that the plate is moved from the second position to the first position by a biasing force of a first spring.

8 Claims, 7 Drawing Sheets

ELECTRONIC APPARATUS

FIELD OF THE INVENTION

The present invention relates to an electronic apparatus.

BACKGROUND OF THE INVENTION

There is known a technology to have a camera built-in an electronic apparatus, such as a laptop computer (hereinafter, referred to as a "laptop") or a smartphone (see, for example, Japanese Unexamined Patent Application Publication No. 2016-21259). This sort of built-in camera is convenient for being used as a Web camera for video chat.

Meanwhile, electronic apparatuses with a built-in camera have the following problems. For example, while using a laptop with a built-in camera, a user may be secretly filmed by a third person through a network. Furthermore, in a case where a user happens to be using a smartphone with a camera on its rear face pointed at a third person, the third person may suspect the user of secretly taking his/her picture, even though the user is just browsing the Web or something.

To solve these problems, there has been developed a camera cover for physically covering a camera as an external accessory. For example, a certain type of camera cover is attached to an upper part of a display, and is configured to be slidable between a position covering a camera (hereinafter, referred to as a "closed state") and a position not covering the camera (hereinafter, referred to as an "open state").

SUMMARY OF THE INVENTION

The above-described camera cover can physically cover the camera; however, a user needs to slide and set the camera cover in the open state or the closed state before and after using the camera, and this operation is troublesome for the user. Furthermore, after using the camera, the user sometimes forgets to slide and set the camera cover in the closed state; in that case, it may not sufficiently protect the user's privacy when the camera is hacked by a third person through a network.

Accordingly, the present invention is intended to provide a technology for an electronic apparatus equipped with a camera capable of sufficiently protecting user's privacy without causing the user operational trouble.

An electronic apparatus according to an aspect of the present invention includes a chassis, a camera installed in the chassis, and a shutter mechanism capable of shielding a lens of the camera from light. The shutter mechanism includes: a plate that is installed so as to be able to move between a first position shielding the lens from light and a second position not shielding the lens from light; a first spring that is connected to the plate, and stretches with movement of the plate from the first position to the second position, to thereby produce a biasing force in a direction of moving the plate back to the first position; a first operation lever that drives the plate to move from the first position to the second position; a second operation lever that moves in conjunction with the movement of the plate driven by the first operation lever, and has an engaged portion engaged with an engaging portion of the plate when the plate has moved to the second position; a second spring that is connected to the second operation lever, and, with the movement of the plate from the first position, is elastically deformed and accumulates a biasing force, and, when the plate has moved to the second position, biases the second operation lever to the side of the plate, to thereby hold the plate with the engaging portion engaged with the engaged portion of the second operation lever; a first wire that is a heat-shrinkable wire whose one end is connected to the first operation lever, and thermally shrinks to thereby drive the first operation lever; a second wire that is a heat-shrinkable wire whose one end is connected to the second operation lever, and thermally shrink to thereby drive the second operation lever; and a control unit that causes the first wire to thermally shrink to thereby drive the first operation lever, and thereby controls so that the plate is moved from the first position to the second position by the first operation lever, and, when the plate is in the second position, causes the second wire to thermally shrink to thereby drive the second operation lever, and thereby releases the engaging portion of the plate from engagement with the engaged portion of the second operation lever and controls so that the plate is moved from the second position to the first position by the biasing force of the first spring.

According to this aspect, when the plate is in the first position, the control unit can cause the first wire to thermally shrink, to thereby move the plate from the first position to the second position; when the plate is in the second position, the control unit can cause the second wire to thermally shrink, to thereby move the plate from the second position back to the first position. Accordingly, the shutter mechanism can be opened/closed without the user manually operating the shutter mechanism. As a result, it is possible to free the user from operational trouble and to prevent the user from forgetting an operation, and also possible to sufficiently protect the user's privacy. Consequently, it is possible to reduce not only the concern of a user who is using an electronic apparatus that the user may be secretly filmed by a third person through a network but also the concern of a user who is using an electronic apparatus that a third person may suspect the user of secretly taking his/her picture.

The above-described aspect of the present invention can provide a technology for an electronic apparatus equipped with a camera capable of sufficiently protecting user's privacy without causing the user operational trouble.

DETAILED DESCRIPTION OF THE INVENTION

A preferred embodiment of the present invention will be described with reference to accompanying drawings. It is to be noted that in the drawings, components with the same reference numeral have the same or similar configuration.

The following embodiment is an example where the present invention is applied to a laptop. The present invention is applicable to various electronic apparatuses such as desktop computers, tablet computers, and smartphones, besides laptops.

Figure 1:
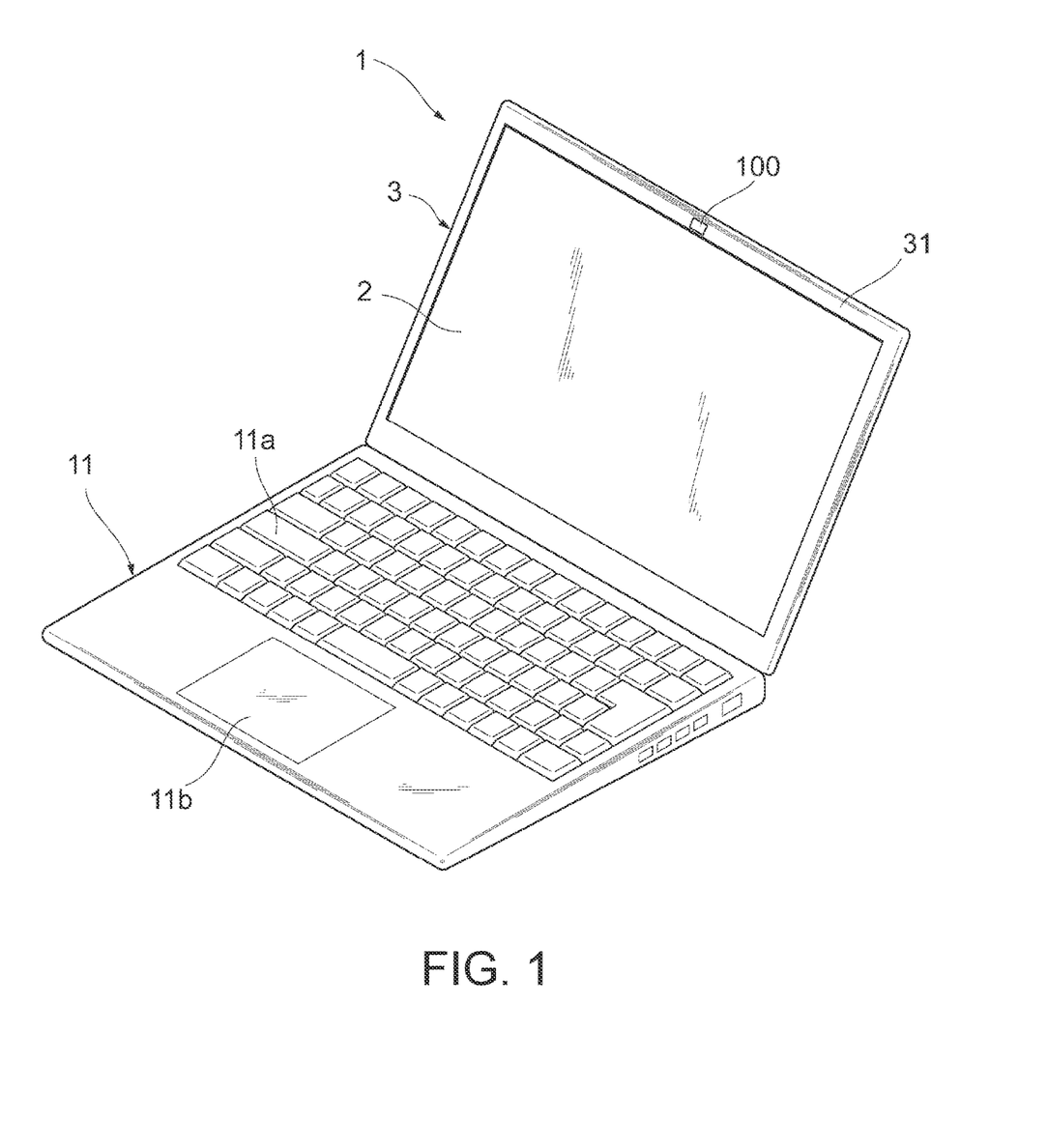
FIG. 1 is a perspective view showing a laptop (an electronic apparatus) according to an embodiment.
Figure 2:
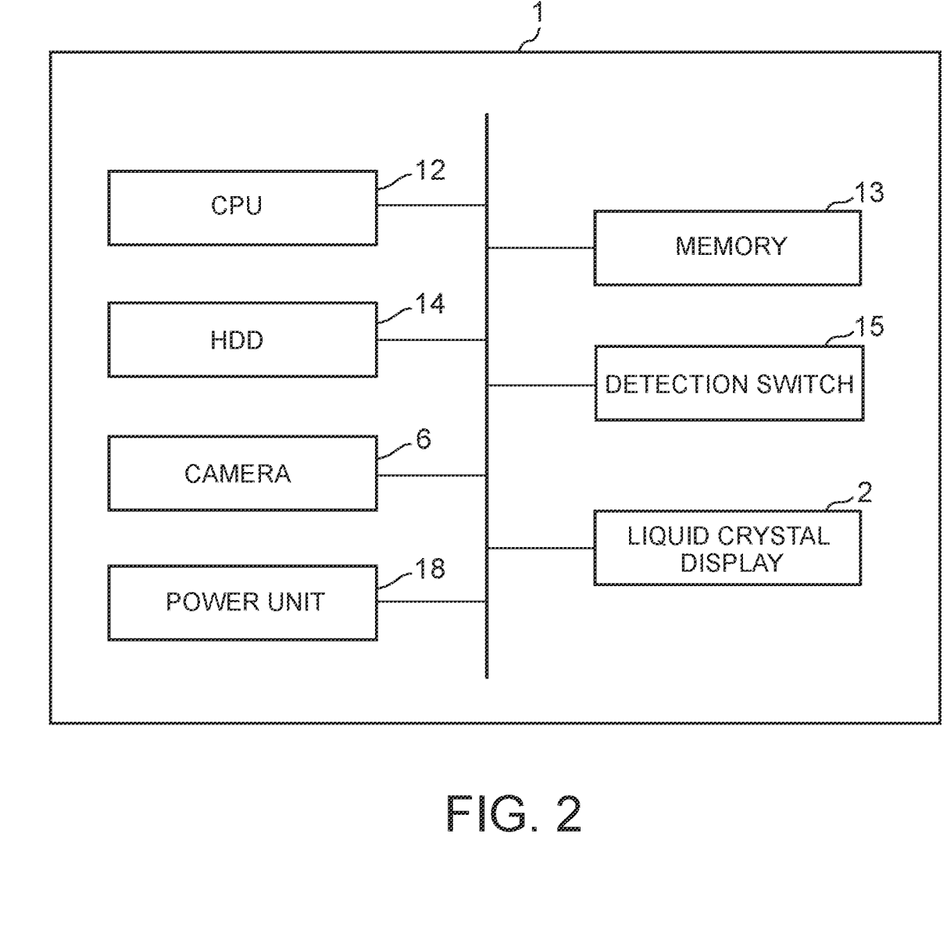
FIG. 2 is a block diagram showing a hardware configuration of the laptop according to the embodiment.

A configuration of a laptop (an electronic apparatus) 1 according to the present embodiment is described with reference to FIGS. 1 and 2. FIG. 1 is a perspective view illustrating the external appearance of the laptop 1. FIG. 2 is a schematic block diagram illustrating a hardware configuration of the laptop 1.

As shown in FIG. 1, the laptop 1 has a main body chassis 11 and a cover chassis 3 that is connected to an end of the main body chassis 11 by hinges and is openable and closable with respect to the main body chassis 11. Furthermore, an upper end of the standing cover chassis 3 is provided with a camera 6 (not shown) and a shutter mechanism 100 that covers a lens of the camera 6.

The main body chassis 11 has a shape of a flattened box. Although not shown in FIG. 1, a circuit board, various electronic devices to be described later, etc. are housed in the main body chassis 11. On the top of the main body chassis 11, input devices such as a keyboard 11a and a touchpad 11b that receive an input from a user are provided. It is to be noted that the main body chassis 11 and the cover chassis 3 are referred to collectively as the "chassis".

The cover chassis 3 is made of a resin material, and houses therein electronic components such as a liquid crystal display 2. While in the closed state, the cover chassis 3 covers and protects the keyboard 11a, etc. Furthermore, while in the open state, the cover chassis 3 stands as shown in FIG. 1 to expose the keyboard 11a, etc. Hereinafter, in a state where the cover chassis 3 stands, a direction from the side of the cover chassis 3 to the user side is referred to as a "front direction", and a right-and-left direction viewed from the user facing the cover chassis 3 is referred to as a "width direction".

The cover chassis 3 has a bezel 31. The bezel 31 is a frame body, and the liquid crystal display 2 is exposed through this frame. The shutter mechanism 100 is provided on an upper end of the bezel 31 of the standing cover chassis 3 (hereinafter, referred to as "the upper end of the bezel 31") and substantially at the center of the upper end of the bezel 31 in the width direction.

It is to be noted that the position of the shutter mechanism 100 is not limited to an example shown in FIG. 1, and can be fittingly changed in accordance with the position of the lens of the camera 6 mounted on the laptop 1.

As shown in FIG. 2, the laptop 1 includes, for example, a CPU (a processor) 12, a memory 13, an HDD 14, a detection switch 15, the camera 6, the liquid crystal display 2, and a power unit 18.

The CPU 12 includes an arithmetic logic unit and various registers (a program counter, a data register, an instruction register or a general-purpose register, etc.). The CPU 12 executes, for example, an operating system program, a driver program, an application program, etc. (hereinafter, also referred to collectively as "various programs"), thereby outputting a result of predetermined arithmetic processing and realizing various functions of a control unit 110 of the laptop 1 to be described later. The CPU 12 is an example of the control unit 110.

The memory 13 is, for example, a storage medium such as a random access memory (RAM). The memory 13 temporarily stores therein program codes of various programs executed by the CPU 12 and data required to execute the various programs. The memory 13 stores therein, for example, a camera application for displaying an operation screen on the liquid crystal display 2. The operation screen is a screen displayed on the liquid crystal display 2 for the user to operate the camera 6, and through which an operation input from the user for, for example, setting the brightness of the camera 6, switching to still image mode or moving image mode, or setting the aspect ratio of a shooting image is received and reflected in the camera 6. Furthermore, the camera application is an application program for controlling the camera 6 in accordance with an operation input received through the operation screen.

The HDD 14 is a non-volatile storage medium. The HDD 14 stores therein various programs and various data. Such programs and data are loaded into the memory 13 as needed and browsed by the CPU 12.

The detection switch 15 detects whether the shutter mechanism 100 is open or closed to the lens of the camera 6. Specifically, the detection switch 15 detects whether a plate 40 of the shutter mechanism 100 is located in a position covering the lens of the camera 6 (a position in the closed state) or a position not covering the lens of the camera 6 (a position in the open state). Hereinafter, in this specification, the position in which the plate 40 of the shutter mechanism 100 covers the lens of the camera 6 is referred to as a "first position", and the position in which the plate 40 of the shutter mechanism 100 does not cover the lens of the camera 6 (in other words, the position in which the plate 40 causes the lens of the camera 6 to be exposed) is referred to as a "second position".

The camera 6 is a photographing device that has the lens (not shown) and an image sensor (not shown) and generates image data by receiving light. The camera 6 is mounted on a circuit board (not shown).

The liquid crystal display 2 is an example of a display. The liquid crystal display 2 is installed in the cover chassis 3, and displays thereon a variety of information on the basis of an input received by the keyboard 11a or the touchpad 11b. Specifically, first, a graphics controller (not shown) performs a predetermined operation on the basis of an input received by the keyboard 11a or the like, and transmits a control signal corresponding to a result of the operation to the liquid crystal display 2. The liquid crystal display 2 receives the control signal, and displays thereon an image or text.

The power unit 18 is a device that is electrically connected to first and second wires 90a and 90b of the shutter mechanism 100 and causes the first and second wires 90a and 90b to thermally shrink. A device having a function of electrifying the first wire 90a or the second wire 90b is used as the power unit 18; however, the power unit 18 is not limited to this. That is, the power unit 18 in the present embodiment can be various other devices as long as they can cause the first wire 90a or the second wire 90b to thermally shrink. It is to be noted that the amount of electric power applied from the power unit 18 to the first wire 90a or the second wire 90b is controlled by the control unit 110 to be described later.

Figure 3:
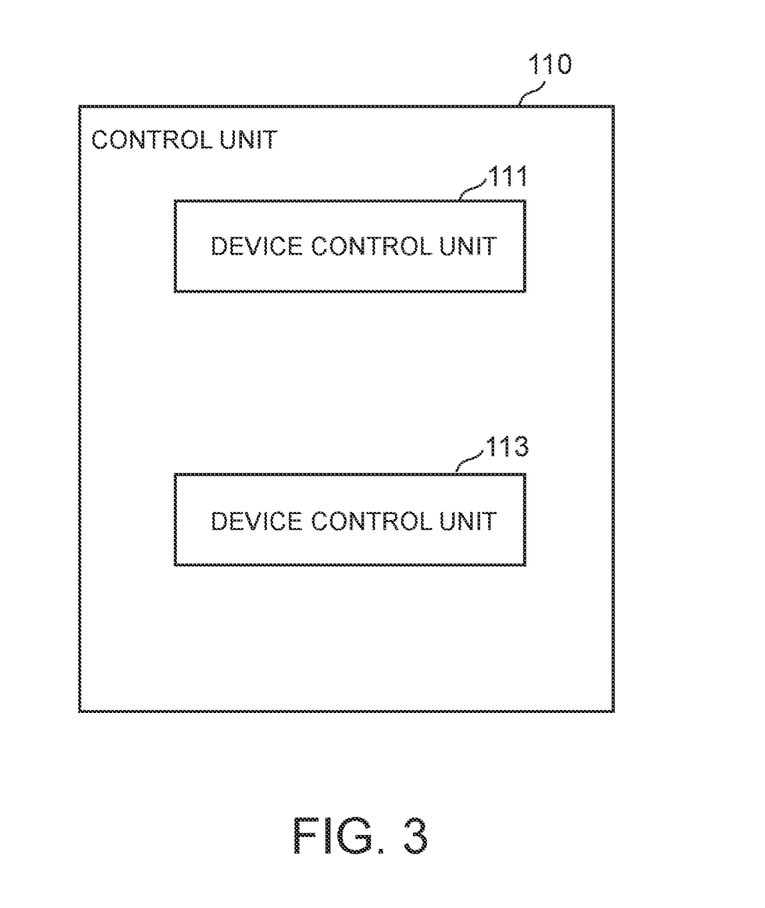
FIG. 3 is a block diagram showing a functional configuration of the laptop according to the embodiment.

A functional configuration of the laptop 1 is described with reference to FIG. 3. The control unit 110 of the laptop 1 includes, for example, a device control unit 111 and a power control unit 113.

The device control unit 111 activates the camera 6 in a case where the detection switch 15 has detected that the plate 40 of the shutter mechanism 100 has moved from the first position to the second position, and deactivates the camera 6 in a case where the detection switch 15 has detected that the plate 40 of the shutter mechanism 100 has moved from the second position to the first position. This configuration enables the camera 6 to be activated or deactivated by moving the shutter mechanism 100 between the first position and the second position.

It is to be noted that, for example, in a case where the detection switch 15 detects that the shutter mechanism 100 has moved from the first position to the second position, the device control unit 111 may display a confirmation screen asking whether to activate the camera 6 on the liquid crystal display 2. Furthermore, for example, in a case where the detection switch 15 detects that the shutter mechanism 100 has moved from the second position to the first position, the device control unit 111 may display a confirmation screen asking whether to deactivate the camera 6 on the liquid crystal display 2.

The above-described configuration solves a situation in which the camera 6 remains activated even after the plate 40 of the shutter mechanism 100 has been moved from the second position to the first position to cover the lens of the camera 6. Accordingly, it is possible to reduce unnecessary power consumption of the camera 6. Furthermore, the above-described configuration makes an operation for activating or deactivating the camera 6 separately after the plate 40 of the shutter mechanism 100 is moved between the first position and the second position unnecessary or simple; therefore, it is possible to provide an electronic apparatus that offers high convenience while protecting privacy.

Figure 4A:
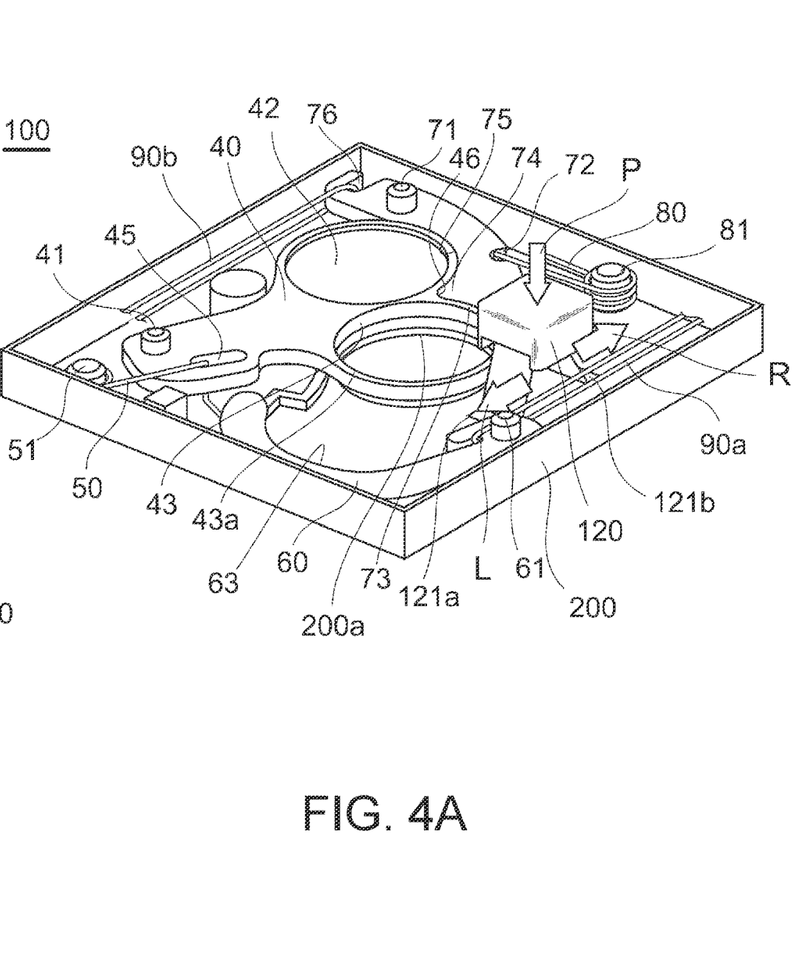
FIGS. 4A-B are schematic configuration diagrams showing a configuration of a shutter mechanism.
Figure 4B:
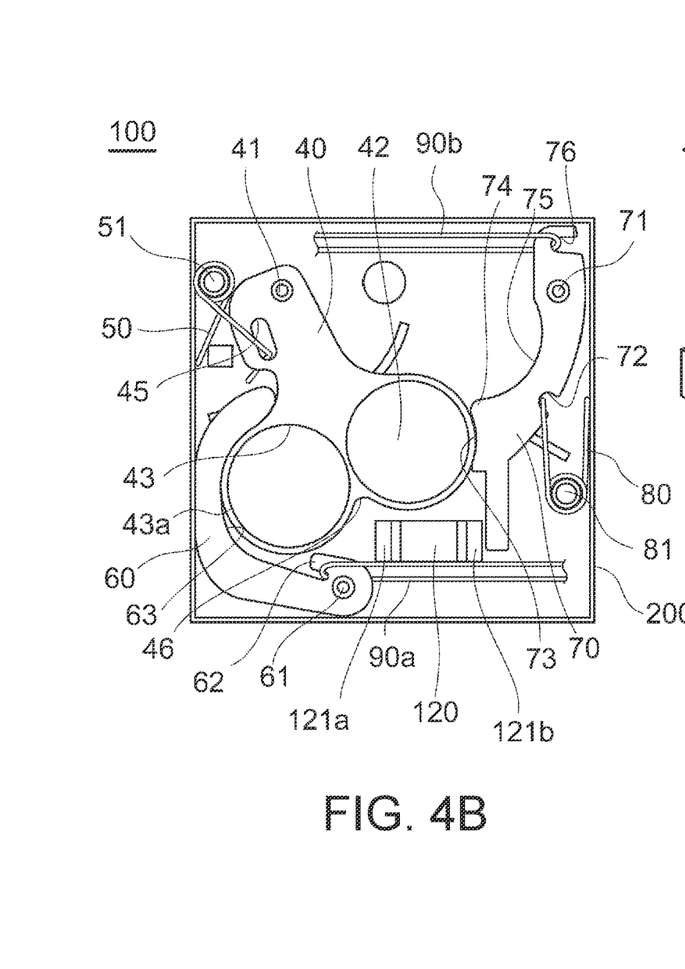

A configuration of the upper end of the bezel 31 is described with reference to FIG. 4. FIG. 4A is a perspective view showing a configuration of the shutter mechanism 100. FIG. 4B is a plan view showing the configuration of the shutter mechanism 100.

The shutter mechanism 100 includes the plate 40, a first spring 50, a first operation lever 60, a second operation lever 70, a second spring 80, the first wire 90*a*, the second wire 90*b*, and a frame body 200 that surrounds these members. The power unit 18 (see FIG. 2) is electrically connected to the first and second wires 90*a* and 90*b*; electric power from the power unit 18 is controlled by the control unit 110 (see FIG. 3). An opening 200*a* is formed on the frame body 200, and the lens of the camera 6 (not shown) is exposed through the opening 200*a*.

The plate 40 is a substantially flat plate member capable of moving to a position covering the lens of the camera 6 and a position not covering the lens of the camera 6. The plate 40 is installed so as to be able to move rotationally around a projection 41 (a fixed member) fixed to the chassis as the rotation center. In the present embodiment, the plate 40 moves rotationally from the first position shielding the lens of the camera 6 from light to the second position not shielding the lens of the camera 6 from light around the projection 41 fixed to the chassis as the rotation center. The plate 40 has a shielding plate 42 and an opening 43. The shielding plate 42 shields the lens of the camera 6 from light when the plate 40 has moved to the first position. The opening 43 exposes the lens of the camera 6 therethrough when the plate 40 has moved to the second position. The opening 43 is a substantially circular opening so that the lens of the camera 6 is exposed therethrough. When the plate 40 moves rotationally to a position where the opening 43 overlaps with the opening 200*a* of the frame body 200, the lens of the camera 6 can be exposed. A through hole 45 is formed on a portion of the plate 40 near the first spring 50; the through hole 45 runs through the plate 40 in a thickness direction. The first spring 50 is engaged with the through hole 45.

The first spring 50 is an elastic member (for example, a spring having a predetermined spring modulus) that produces a biasing force to move the plate 40 from the second position back to the first position. One end of the first spring 50 is wound around a projection 51 fixedly provided on the chassis, and the other end is engaged with the through hole 45 of the plate 40. The first spring 50 whose one end is fixed to the chassis stretches with the movement of the plate 40 from the first position to the second position, and produces a biasing force in a direction of moving the plate 40 back to the first position. As will be described later, when the plate 40 having moved to the second position is moved back to the first position, the first spring 50 releases the accumulated biasing force, and the plate 40 is moved from the second position to the first position by the biasing force.

The first operation lever 60 is a driving member that is driven with the thermal shrinkage of the first wire 90*a* and presses the plate 40 to move the plate 40 to a predetermined position. When the plate 40 is in the first position, a portion of the first operation lever 60 is in contact with one end of the plate 40. Specifically, as shown in FIG. 4B, the first operation lever 60 is provided along a portion of an annular portion 43*a* substantially annularly surrounding the periphery of the opening 43 of the plate 40. One end of the first operation lever 60 is fitted onto a projection 61 (a fixed member) fixedly provided on the chassis so that the first operation lever 60 can move rotationally around the projection 61 as the rotation center. The first operation lever 60 is provided with a locking part 62 for hooking and holding the first wire 90*a* having the heat-shrinkable property. As will be described later, if the first wire 90*a* thermally shrinks and its length varies, the first operation lever 60 is pulled by the first wire 90*a* and moves rotationally clockwise around the projection 61 as the rotation center, and the plate 40 moves with the rotational movement of the first operation lever 60. In the present embodiment, the first operation lever 60 moves rotationally so as to press and move the plate 40 from the first position to the second position.

The second operation lever 70 is a driving member that is pressed against the plate 40 by a biasing force of the second spring 80 to hold the plate 40 in a predetermined position. The second operation lever 70 is provided on the side opposite to the first operation lever 60 across the plate 40, and is provided with a portion thereof in contact with the other end of the plate 40 (the right end of the plate 40 in FIG. 4B). The second operation lever 70 is fitted onto a projection 71 fixedly provided on the chassis so as to be able to move rotationally around the projection 71 as the rotation center.

A notch 72 is formed on the side of the second operation lever 70 that is the side opposite to the plate 40; the second spring 80 is engaged with the notch 72. When the plate 40 is in the first position, the second operation lever 70 is biased to the side of the plate 40 by the second spring 80 engaged with the notch 72, and an inner edge 73 of the second operation lever 70 is pressed against the outer edge of the shielding plate 42 of the plate 40. As described above, the first operation lever 60 is provided so as to support one end of the plate 40 when the plate 40 is in the first position; therefore, the plate 40 is sandwiched and held between an inner edge 63 of the first operation lever 60 and the inner edge 73 of the second operation lever 70.

The second operation lever 70 is configured to be driven in conjunction with the driving of the first operation lever 60. Specifically, when the plate 40 moves by being pressed by the first operation lever 60 against the biasing force of the second spring 80 to bias the second operation lever 70 to the side of the plate 40, the second operation lever 70 is driven in conjunction with the movement of the plate 40. As described above, the second operation lever 70 is configured to move rotationally around the projection 71 as the rotation center; therefore, with the movement of the plate 40 from the first position, the second operation lever 70 moves rotationally counterclockwise around the projection 71 as the rotation center. When the plate 40 moves from the first position and reaches the second position, the second operation lever 70 is biased to the side of the plate 40 by the biasing force of the second spring 80, and an engaged portion 74 of the second operation lever 70 is engaged with an engaging portion 46 of the plate 40. It is to be noted that the engaging portion 46 of the plate 40 is a recessed portion located between the shielding plate 42 and the opening 43, and the engaged portion 74 of the second operation lever 70 has a protruding shape so as to fit into the engaging portion 46 of the plate 40.

The second operation lever 70 is provided with a locking part 76 for hooking and holding the second wire 90b having the heat-shrinkable property. When the plate 40 is in the second position, if the second wire 90b thermally shrinks and its longitudinal length varies, the second operation lever 70 moves rotationally clockwise around the projection 71 as the rotation center, and the engaging portion 46 of the plate 40 is released from the engagement with the engaged portion 74 of the second operation lever 70. When released from the engagement, the plate 40 moves from the second position to the first position due to the biasing force of the first spring 50.

The second spring 80 is an elastic member (for example, a spring having a predetermined spring modulus) that applies a biasing force to the second operation lever 70 to hold the plate 40 in a predetermined position. One end of the second spring 80 is connected to a projection 81 fixedly provided on the chassis, and the other end is engaged with the notch 72 of the second operation lever 70, and thereby the second operation lever 70 is biased to the side of the plate 40. In the present embodiment, when the plate 40 is in the first position, the second spring 80 biases the second operation lever 70 to the side of the plate 40 to press the inner edge 73 of the second operation lever 70 against the outer edge of the shielding plate 42 and hold the plate 40 in the first position. Furthermore, with the movement of the plate 40 from the first position, the second spring 80 is elastically deformed and accumulates the biasing force, and, when the plate 40 reaches the second position, releases the accumulated biasing force, thereby the second operation lever 70 is biased to the side of the plate 40, and the engaged portion 74 of the second operation lever 70 is engaged with the engaging portion 46 of the plate 40 to hold the plate 40 in the second position.

The first wire 90a is a wire suspended between a portion (not shown) of the chassis and the first operation lever 60. The first wire 90a is made of a heat-shrinkable material. In the present embodiment, the first wire 90a is hooked on the locking part 62 of the first operation lever 60, and the first operation lever 60 is driven to rotate around the projection 61 as the rotation center by the first wire 90a thermally shrinking in its length direction.

The second wire 90b is a wire suspended between a portion (not shown) of the chassis and the second operation lever 70. The second wire 90b is made of a heat-shrinkable material. In the present embodiment, the second wire 90b is hooked on the locking part 76 of the second operation lever 70, and the second operation lever 70 is driven to rotate around the projection 71 as the rotation center by the second wire 90b thermally shrinking in its length direction.

It is to be noted that a conductive and heat-shrinkable material is used in the first and second wires 90a and 90b; however, the materials of the first and second wires 90a and 90b are not limited to this example. For example, a suitable material that is deformed in accordance with energy input from the outside (such as electrical energy, optical energy, or thermal energy) can be used in the first and second wires 90a and 90b. Such materials include, for example, shape memory alloy.

As described above, the power unit 18 (FIG. 2) is electrically connected to the first wire 90a or the second wire 90b; the first wire 90a or the second wire 90b thermally shrinks with electric power from the power unit 18. The amount of electric power applied from the power unit 18 to the first wire 90a or the second wire 90b is controlled by the power control unit 113 (FIG. 3).

It is to be noted that in the present embodiment, the shutter mechanism 100 may be provided with a push mechanism for manually moving the plate 40 from the position causing the lens of the camera 6 to be exposed to the position covering the lens of the camera 6 (i.e., from the second position to the first position). As shown in FIG. 4, the push mechanism includes a push button 120 and plate-like members 121a and 121b. The plate-like members 121a and 121b are connected to the lower side of the push button 120. Pressing the push button 120 causes the lower ends of the plate-like members 121a and 121b to make a sliding movement in a horizontal direction along the surface of the frame body 200. Pressing the push button 120 in a direction of arrow P shown in FIG. 4 causes the lower end of the plate-like member 121a to make a sliding movement in a direction of arrow L shown in FIG. 4 and the lower end of the plate-like member 121b to make a sliding movement in a direction of arrow R shown in FIG. 4. In the present embodiment, when the lower end of the plate-like member 121a makes the sliding movement, the distal end of the plate-like member 121a comes in contact with the first operation lever 60, and the first operation lever 60 moves rotationally counterclockwise around the projection 61 as the rotation center. Furthermore, when the lower end of the plate-like member 121b makes the sliding movement, the distal end of the plate-like member 121b comes in contact with the second operation lever 70, and the second operation lever 70 moves rotationally counterclockwise around the projection 71 as the rotation center. By operating the push button 120 in this way, the first operation lever 60 and the second operation lever 70 can be moved rotationally, and, when the plate 40 is located in the second position, the engaging portion 46 of the plate 40 can be released from the engagement with the engaged portion 74 of the second operation lever 70. When released from the engagement, the plate 40 is biased to a direction of moving the plate 40 from the second position back to the first position by the biasing force of the first spring 50, and moves to the first position.

Subsequently, the operation of the shutter mechanism 100 having the above-described configuration is described. FIG. 5 is a schematic plan view showing the process of moving the plate 40 of the shutter mechanism 100 from the first position to the second position.

Figure 5A:
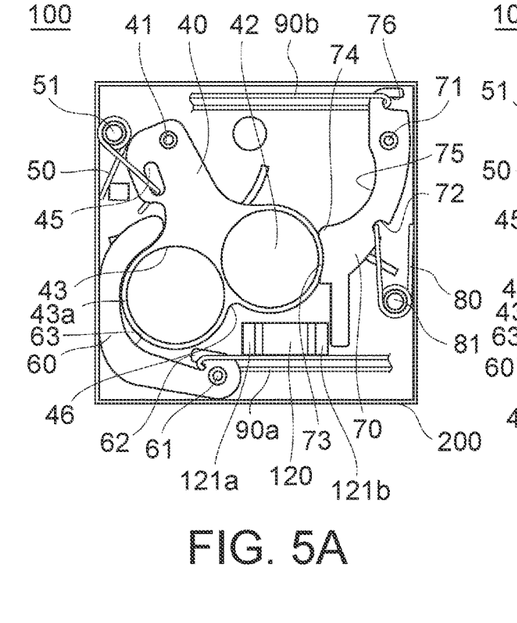
FIGS. 5A-D are diagrams for explaining an operation of the shutter mechanism.
Figure 5B:
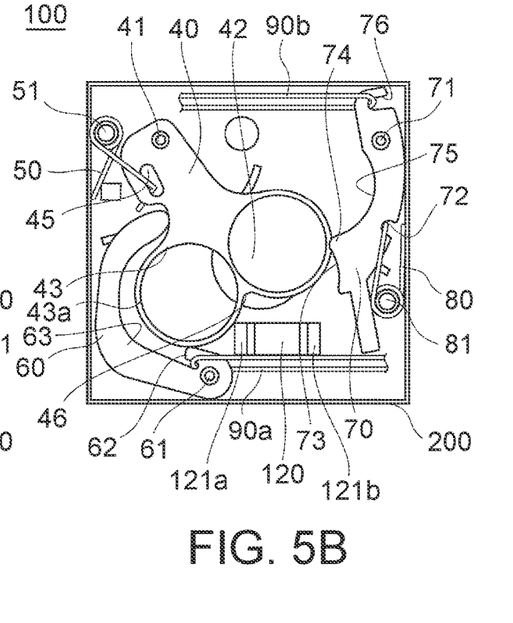
Figure 5C:
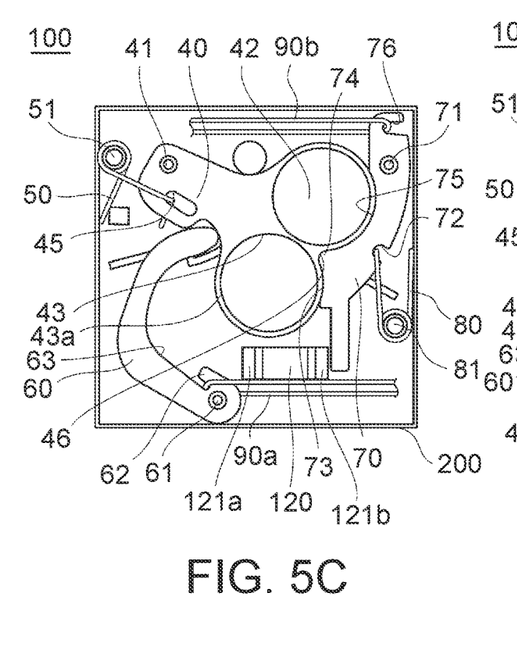
Figure 5D:
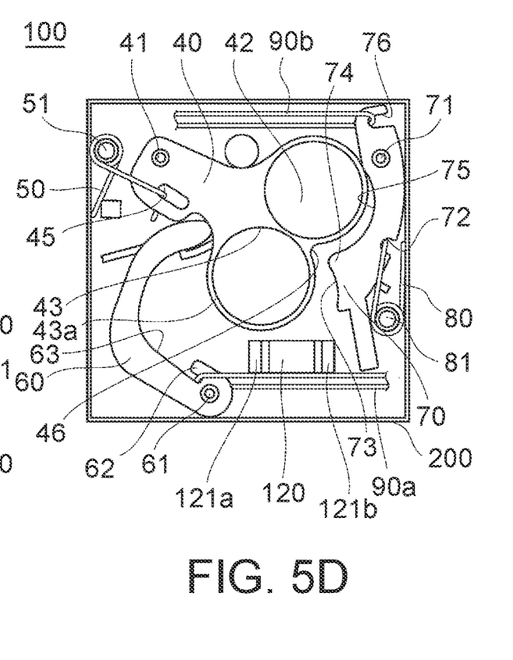

FIG. 5A is a plan view showing a state where the plate 40 is in the first position. FIG. 5B is a plan view showing a state where the plate 40 has moved a predetermined distance from the first position. FIG. 5C is a plan view showing a state where the plate 40 is in the second position. FIG. 5D is a plan view showing how the engaging portion of the plate is released from the engagement with the engaged portion of the second operation lever when the plate 40 is in the second position.

As shown in FIG. 5A, when the plate 40 is in the first position, the inner edge 63 of the first operation lever 60 is in contact with the one end (the left end in FIG. 5A) of the plate 40, and the inner edge 73 of the second operation lever 70 is in contact with the other end (the right end in FIG. 5A) of the plate 40. As described above, the second operation lever 70 is biased to the side of the plate 40 by the biasing force of the second spring 80; therefore, the plate 40 is held by being sandwiched between the inner edge 63 of the first operation lever 60 and the inner edge 73 of the second operation lever 70.

From the state shown in FIG. 5A where the plate 40 is in the first position, when the amount of electric power applied from the power unit 18 to the first wire 90a is controlled by the power control unit 113, the first wire 90a thermally shrinks, and the first operation lever 60 is driven to rotate. Specifically, as shown in FIG. 5B, when the first wire 90a hooked on the locking part 62 of the first operation lever 60 thermally shrinks, the first operation lever 60 moves rotationally counterclockwise around the projection 61 fixed to the chassis as the rotation center. Then, the plate 40 is pressed by the first operation lever 60, and the plate 40 moves against the biasing force of the second spring 80 to bias the second operation lever 70 to the side of the plate 40. With the movement of the plate 40, the second spring 80 is elastically deformed and accumulates the biasing force to bias the second operation lever 70 to the side of the plate 40.

From the state shown in FIG. 5B, when the plate 40 is moved by being pressed by the first operation lever 60, the plate 40 moves to a position where the opening 43 of the plate 40 overlaps with the opening 200a of the frame body 200, i.e., the second position shown in FIG. 5C. When the plate 40 moves to the second position, the second operation lever 70 is biased to the side of the plate 40 by the biasing force of the second spring 80, and the engaged portion 74 of the second operation lever 70 is engaged with the engaging portion 46 of the plate 40. In this way, the engaged portion 74 is engaged with the engaging portion 46 by the second operation lever 70 being biased to the side of the plate 40 by the biasing force of the second spring 80, and thereby the plate 40 is held in the second position. It is to be noted that when the plate 40 is in the second position, the plate 40 is held in a state where an arc-like inner edge 75 of the second operation lever 70 is in contact with the outer edge of the shielding plate 42.

From the state shown in FIG. 5C, when the amount of electric power applied from the power unit 18 to the second wire 90b is controlled by the power control unit 113, the second wire 90b thermally shrinks, and the second operation lever 70 is driven to rotate. Specifically, as shown in FIG. 5D, when the second wire 90b hooked on the locking part 76 of the second operation lever 70 thermally shrinks, the second operation lever 70 moves rotationally counterclockwise around the projection 71 fixed to the chassis as the rotation center. Then, the engaging portion 46 of the plate 40 is released from the engagement with the engaged portion 74 of the second operation lever 70, and the plate 40 is biased to a direction of moving the plate 40 from the second position back to the first position (FIG. 5A) by the biasing force of the first spring 50.

As described above, the plate 40 can be moved between the first position and the second position by the power control unit 113 controlling the amount of electric power applied to the first wire 90a or the second wire 90b.

Figure 6:
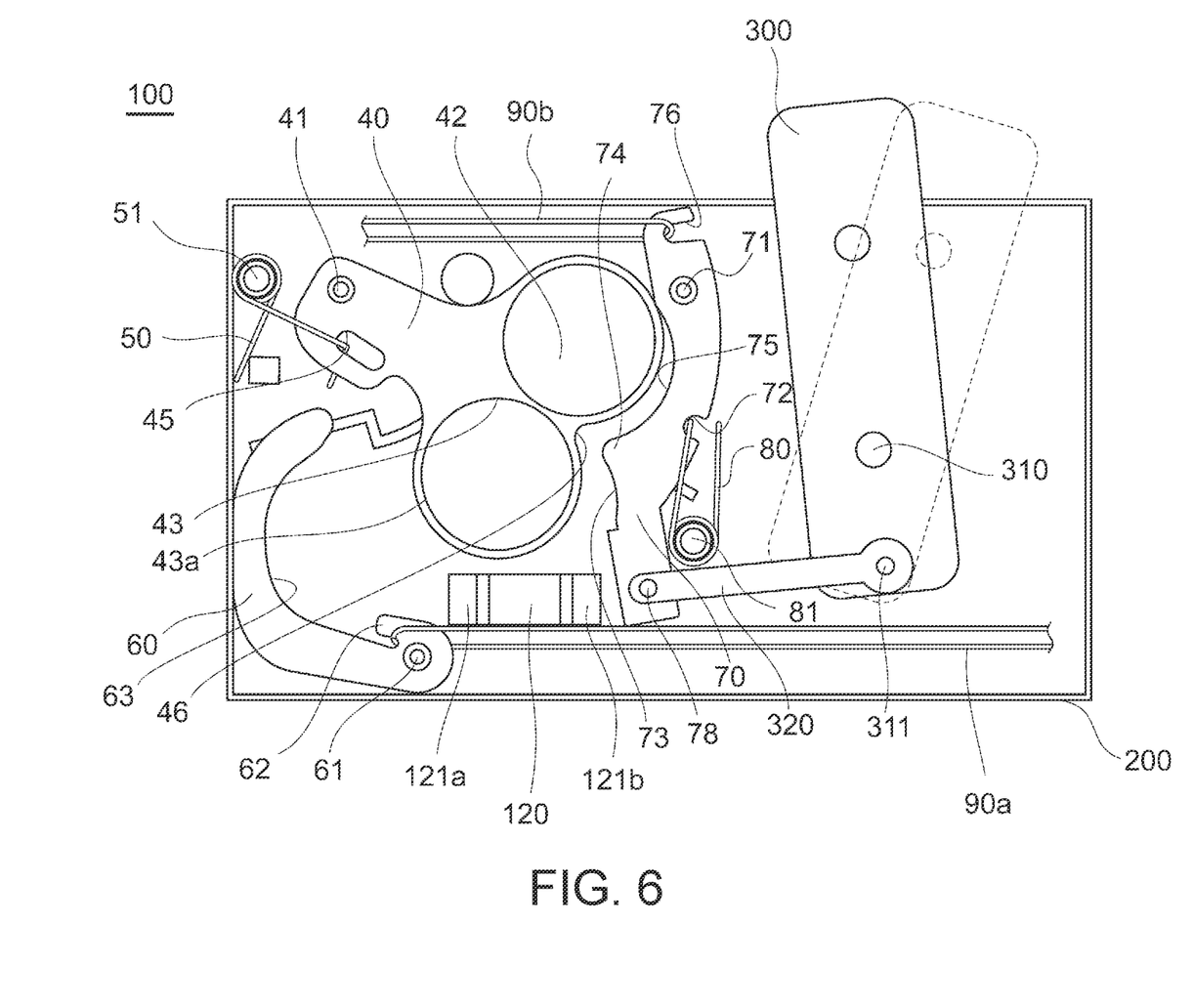
FIG. 6 is a diagram for explaining an operation of a lock mechanism provided alongside the shutter mechanism.

The shutter mechanism 100 described above may be provided with a lock mechanism that restricts the driving of the second operation lever 70. Specifically, as shown in FIG. 6, a lock mechanism including a lock lever 300 and a rod-like member 320 suspended between the lock lever 300 and the second operation lever 70 may be provided alongside the shutter mechanism 100. One end of the lock lever 300 projects upward from the frame body 200, and the other end is connected to the second operation lever 70 through the rod-like member 320. The rod-like member 320 connects, for example, between a projection 78 formed on the second operation lever 70 and a projection 311 formed on the lock lever 300. The lock lever 300 is fitted onto a projection 310 located substantially in the center of its lower part, and is configured to be swingable between a solid line and a broken line shown in FIG. 6 with the projection 310 as the rotation center. When the lock lever 300 is in a position of the broken line shown in FIG. 6, the driving of the second operation lever 70 is not restricted. When the lock lever 300 is in a position of the solid line shown in FIG. 6, the second operation lever 70 is held with its lower end side (a portion of the second operation lever 70 connected to the rod-like member 320) moved to the side of the lock lever 300, and the driving of the second operation lever 70 is restricted. When the second operation lever 70 is held with its lower end side moved to the side of the lock lever 300 in this way, the engaging portion 46 of the plate 40 cannot be engaged with the engaged portion 74 of the second operation lever 70. Accordingly, as shown in FIG. 6, even when the plate 40 is moved to the second position, the plate 40 is not held in the second position by the second operation lever 70 and the second spring 80, and is moved back to the first position by the biasing force of the first spring 50.

Figure 7A:
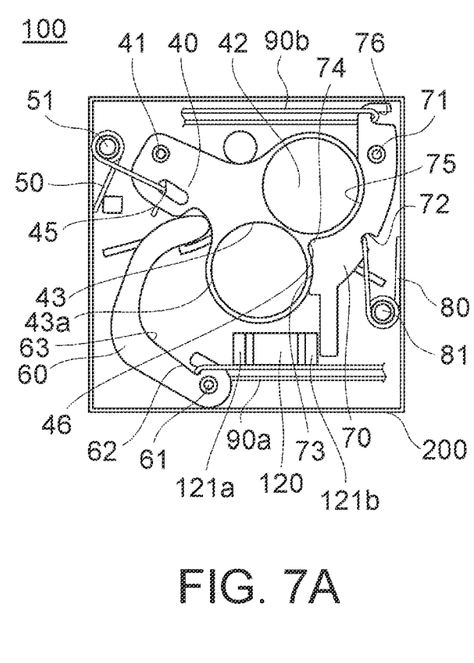
FIGS. 7A-C are diagrams for explaining a manual operation of the shutter mechanism.
Figure 7B:
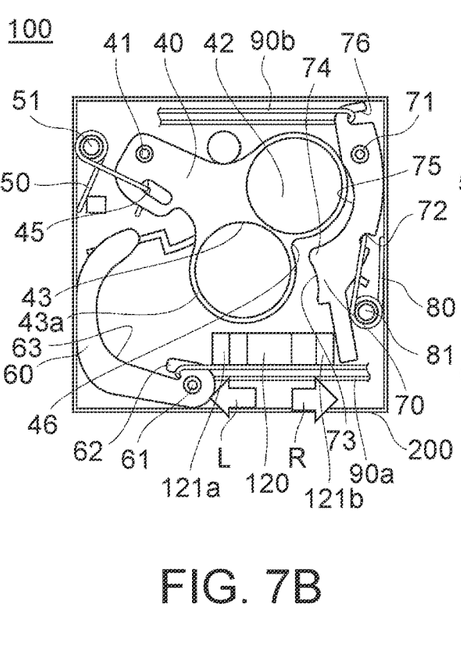
Figure 7C:
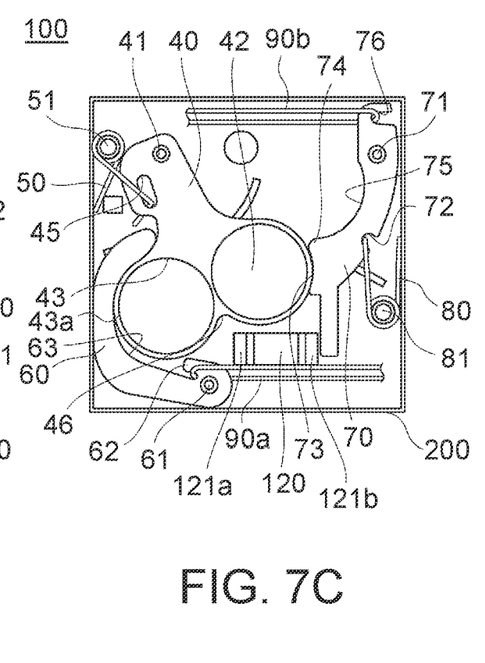

In the shutter mechanism 100 described above, the plate 40 may be configured to be manually moved from the second position back to the first position by pressing the push button 120. The operation to manually move the plate 40 from the second position back to the first position is described with reference to FIG. 7.

As shown in FIG. 7A, when the plate 40 is in the second position, by pressing the push button 120 located between the first operation lever 60 and the second operation lever 70 and below the plate 40, the plate-like members 121a and 121b slide in a direction away from each other, i.e., the plate-like member 121a slides to the left side (a direction of arrow L shown in FIG. 7B), and the plate-like member 121b slides to the right side (a direction of arrow R shown in FIG. 7B). The lower end of the plate-like member 121a makes a sliding movement in the horizontal direction (in other words, the plate-like member 121a projects in the horizontal direction), thereby the distal end of the plate-like member 121a comes in contact with the first operation lever 60, and the first operation lever 60 is driven to rotate counterclockwise around the projection 61 as the rotation center. Furthermore, the lower end of the plate-like member 121b makes a sliding movement in the horizontal direction (in other words, the plate-like member 121b projects in the horizontal direction), thereby the distal end of the plate-like member 121b comes in contact with the second operation lever 70, and the second operation lever 70 is driven to rotate counterclockwise around the projection 71 as the rotation center. With the counterclockwise rotation of the second operation lever 70 around the projection 71 as the rotation center, the engaging portion 46 of the plate 40 is released from the engagement with the engaged portion 74 of the second operation lever 70 as shown in FIG. 7B. Then, the plate 40 is not held in the second position by the second operation lever 70 and the second spring 80, and is moved back to the first position by the biasing force of the first spring 50 as shown in FIG. 7C.

The above-described configuration enables, even in a case where the laptop 1 is in power OFF state, the shutter mechanism 100 to be forcibly closed (i.e., the plate 40 to be moved to the first position) by operating the push button 120. For example, in a case where the push button 120 is operated during an operation to open the shutter mechanism 100 (i.e., to move the plate 40 to the second position) under the control of the control unit 110, it may be configured to prioritize the operation on the push button 120 for closing the shutter mechanism 100. By setting a priority on such a manual operation, the shutter mechanism 100 can be forcibly closed anytime at the user's discretion.

In the embodiment described above, at the time of startup of the laptop 1, if the detection switch 15 configured to detect the open/closed state of the shutter mechanism 100 with respect to the lens of the camera 6 detects that the plate 40 is in the first position, the control unit 110 may control the amount of electric power applied from the power unit 18 to the first wire 90*a*.

The above-described configuration enables, at the time of startup of the laptop 1, the plate 40 to be moved to the second position not shielding the lens of the camera 6 from light without having to manually put the shutter mechanism 100 into the open state.

Furthermore, in the embodiment described above, at the time of shutdown of the laptop 1, if the detection switch 15 detects that the plate 40 is in the second position, the control unit 110 may control the amount of electric power applied from the power unit 18 to the second wire 90*b*.

The above-described configuration enables, at the time of shutdown of the laptop 1, the plate 40 to be moved to the first position shielding the lens of the camera 6 from light without having to manually put the shutter mechanism 100 into the closed state.

Moreover, in the embodiment described above, at the time of activation of the camera 6, if the detection switch 15 detects that the plate 40 is in the first position, the control unit 110 may control the amount of electric power applied from the power unit 18 to the first wire 90*a*. Furthermore, at the time of deactivation of the camera 6, if the detection switch 15 detects that the plate 40 is in the second position, the control unit 110 may control the amount of electric power applied from the power unit 18 to the second wire 90*b*.

The above-described configuration enables, at the time of activation of the camera 6, the plate 40 to be moved to the second position not shielding the lens of the camera 6 from light without having to manually put the shutter mechanism 100 into the open state. Furthermore, at the time of deactivation of the camera 6, the plate 40 can be moved to the first position shielding the lens of the camera 6 from light without having to manually put the shutter mechanism 100 into the closed state.

In the embodiment described above, the plate 40 is configured to move rotationally; however, the plate 40 may be configured, for example, to make a sliding movement as long as the plate 40 can be held in the first position or the second position. The same applies to the first operation lever 60 and the second operation lever 70; the first operation lever 60 and the second operation lever 70 are not limited to the configuration of rotational movement.

In the embodiment described above, there is described an example where the shutter mechanism 100 is applied to the laptop 1; however, as described above, it can be applied to other electronic apparatuses (for example, smartphones, etc.). In a case where the shutter mechanism 100 is applied to the laptop 1 equipped with a camera, it is possible to reduce user's concern that while using the laptop 1, the user may be secretly filmed by a third person through a network. Furthermore, for example, in a case where the shutter mechanism 100 is applied to a smartphone, it is also possible to reduce user's concern that while using the smartphone with a camera on its rear face pointed at a third person, the third person may suspect the user of secretly taking his/her picture.

The embodiment described above is intended to facilitate understanding of the present invention and not to interpret the present invention in a limited way. Any flowcharts and sequences described in the embodiment, and any components included in the embodiment and their layout, material, condition, shape, size, etc. are not limited to those illustrated as an example and can be changed accordingly. Furthermore, components shown in different embodiments can be partially replaced or combined.

The invention claimed is:

1. An electronic apparatus comprising:
a chassis;
a camera installed in the chassis; and
a shutter mechanism configured to shield a lens of the camera from light,
the shutter mechanism including:
a plate configured to move between a first position shielding the lens from light and a second position not shielding the lens from light,
a first spring connected to the plate, and configured to stretch with movement of the plate from the first position to the second position, to thereby produce a biasing force in a direction of moving the plate back to the first position,
a first operation lever configured to drive the plate to move from the first position to the second position,
a second operation lever configured to move in conjunction with the movement of the plate driven by the first operation lever, the second operation lever having an engaged portion engaged with an engaging portion of the plate when the plate has moved to the second position,
a second spring connected to the second operation lever, and is configured to, with the movement of the plate from the first position, be elastically deformed and accumulate a biasing force, and, when the plate has moved to the second position, to bias the second operation lever to a side of the plate, to thereby hold the plate with the engaging portion engaged with the engaged portion of the second operation lever,
a first wire that is heat-shrinkable and having one end connected to the first operation lever, and is configured to thermally shrink and thereby drive the first operation lever,
a second wire that is heat-shrinkable and having one end connected to the second operation lever, and is configured to thermally shrink and thereby drive the second operation lever, and
a control unit configured to cause the first wire to thermally shrink and thereby drive the first operation lever, and thereby provide control so that the plate is moved from the first position to the second position by the first operation lever and, when the plate is in the second position, to cause the second wire to thermally shrink and thereby drive the second operation lever, and to thereby release the engaging portion of the plate from engagement with the engaged portion of the second operation lever and to provide control so that the plate is moved from the second position to the first position by the biasing force of the first spring.

2. The electronic apparatus according to claim 1, further comprising:
a detecting device configured to detect whether the plate is in the first position or the second position,
wherein, at time of startup of the electronic apparatus, when the detecting device detects that the plate is in the first position, the control unit is configured to cause the first wire to thermally shrink, and
at time of shutdown of the electronic apparatus, when the detecting device detects that the plate is in the second position, the control unit is configured to cause the second wire to thermally shrink.

3. The electronic apparatus according to claim 1, further comprising:
a detecting device configured to detect whether the plate is in the first position or the second position,
wherein, at time of activation of the camera, when the detecting device detects that the plate is in the first position, the control unit is configured to cause the first wire to thermally shrink, and
at time of deactivation of the camera, when the detecting device detects that the plate is in the second position, the control unit is configured to cause the second wire to thermally shrink.

4. The electronic apparatus according to claim 1, wherein the plate is configured to move rotationally from the first position to the second position around a fixed member, as a rotation center, fixed to the chassis.

5. The electronic apparatus according to claim 1, wherein the plate includes:
a shielding plate configured to shield the lens of the camera from light when the plate has moved to the first position; and
an opening configured to expose the lens of the camera when the plate has moved to the second position.

6. The electronic apparatus according to claim 1, wherein:
one end of the first spring is fixed to the chassis and an other end is engaged with a through hole formed on the plate, and
when the plate is moved from the first position by the first operation lever, the first spring is configured to produce a biasing force in a direction of biasing the plate back to the first position.

7. The electronic apparatus according to claim 1, wherein:
the first operation lever is configured to move rotationally around a first fixed member, as a rotation center, fixed to the chassis, and
the second operation lever is configured to move rotationally around a second fixed member, as a rotation center, fixed to the chassis.

8. The electronic apparatus according to claim 1, wherein a lock mechanism configured to restrict driving of the second operation lever is alongside the shutter mechanism.

* * * * *